July 4, 1961  H. A. DE CENZO  2,991,090
VALVED COUPLING
Filed Feb. 10, 1958  3 Sheets-Sheet 1

INVENTOR.
Herbert A. DeCenzo
By Smyth & Roston
Attorneys

July 4, 1961

H. A. DE CENZO 2,991,090

VALVED COUPLING

Filed Feb. 10, 1958

INVENTOR.
Herbert A. DeCenzo

By Smyth & Roston
Attorneys

July 4, 1961 H. A. DE CENZO 2,991,090
VALVED COUPLING
Filed Feb. 10, 1958 3 Sheets-Sheet 3

INVENTOR.
Herbert A. DeCenzo
Attorneys

United States Patent Office 2,991,090
Patented July 4, 1961

2,991,090
VALVED COUPLING
Herbert A. De Cenzo, Arcadia, Calif., assignor to On Mark Couplings, Inc., Los Angeles, Calif., a corporation of California
Filed Feb. 10, 1958, Ser. No. 714,342
11 Claims. (Cl. 284—18)

This invention relates to a coupling for interconnecting two fluid passage means and, more particularly, relates to such a coupling that incorporates valves to seal off the two passage means automatically whenever the coupling is opened. Included in the objects of this invention are:

First, to provide a coupling for interconnecting a pair of fluid passage means, which coupling incorporates a pair of valves for closing the two passage means respectively in response to opening of the coupling for disconnecting the two passage means, the arrangement being such that the two valves are closed for complete sealing of the two passage means before actual separation of the two passage means.

Second, to provide a self-sealing coupling wherein the valve structures afford, when open, a full, unrestricted, and unimpeded passageway for the flow of fluid.

Third, to provide a self-sealing coupling wherein the valve structures of the coupling components are arranged in contiguous relation, so that only an insignificant amount of fluid present between the valve structures is lost when the coupling components are separated.

Fourth, to provide such a dual-valve coupling which requires only simple manipulation to effect connection and disconnection with the two valves operatively responsive to the same manipulation.

With the above and other objects in view, as may appear hereinafter, reference is directed to the accompanying drawings in which.

Figure 3:
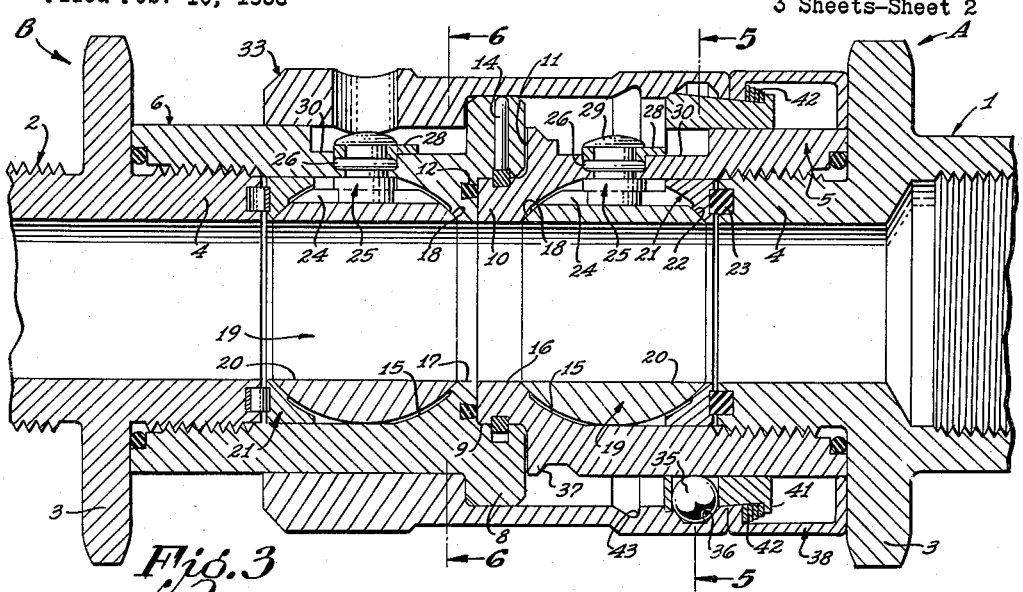
FIG. 3 is a longitudinal sectional view taken through 3—3 of FIG. 1, showing the coupling units joined together.
Figure 4:
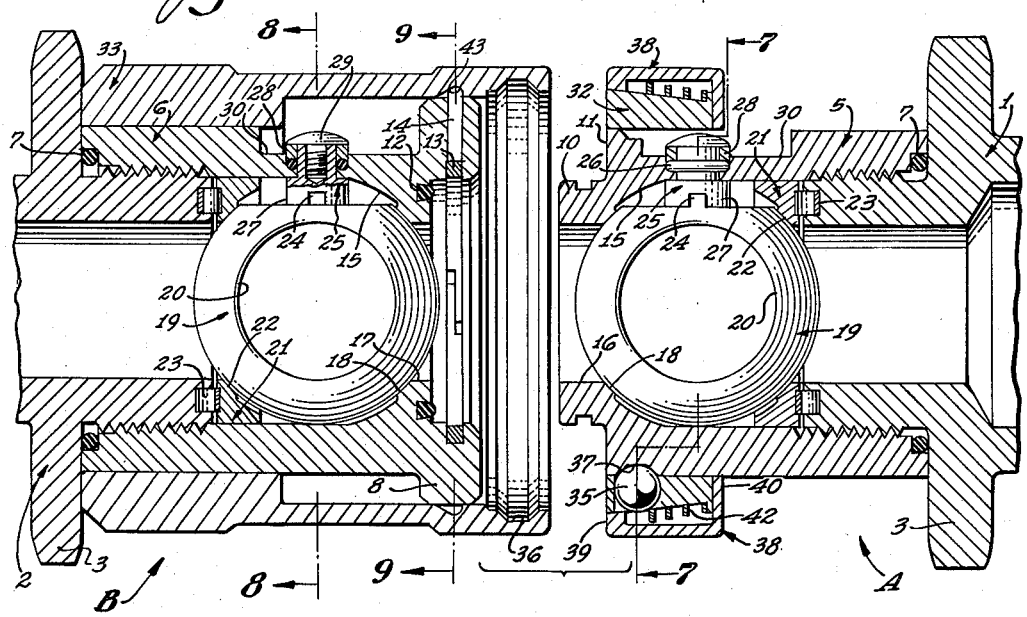
FIG. 4 is a longitudinal sectional view through 4—4 of FIG. 2, showing the coupling units separated.
Figure 5:
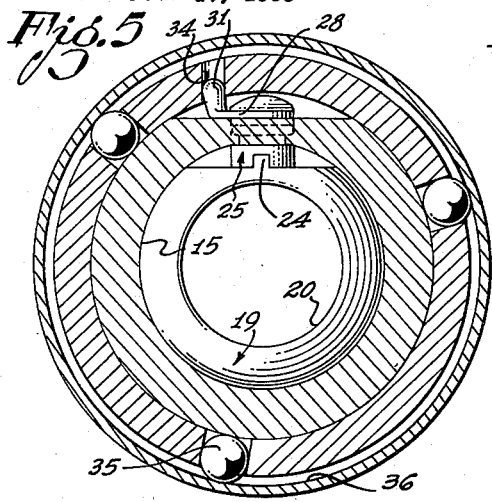
Figure 7:
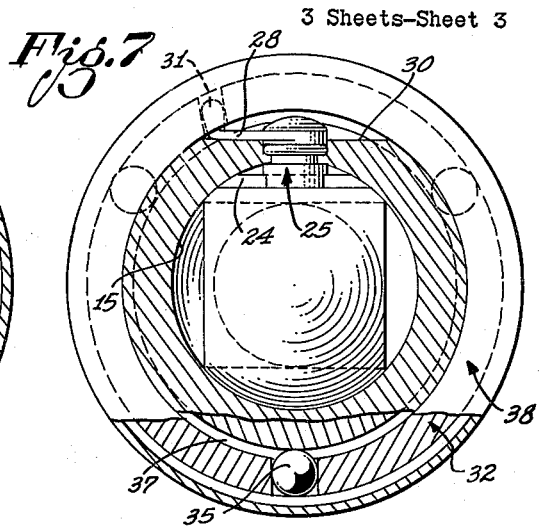
Figure 6:
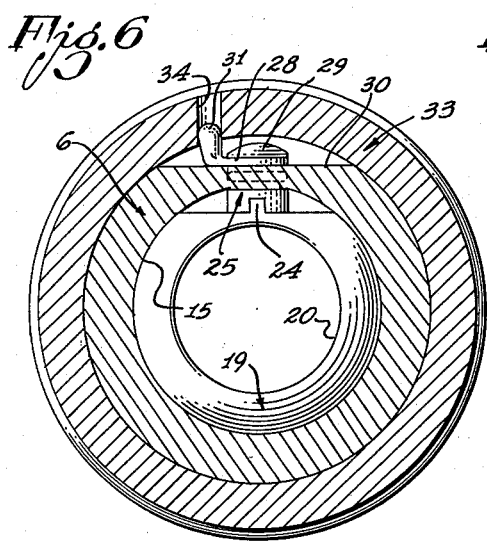
Figure 8:
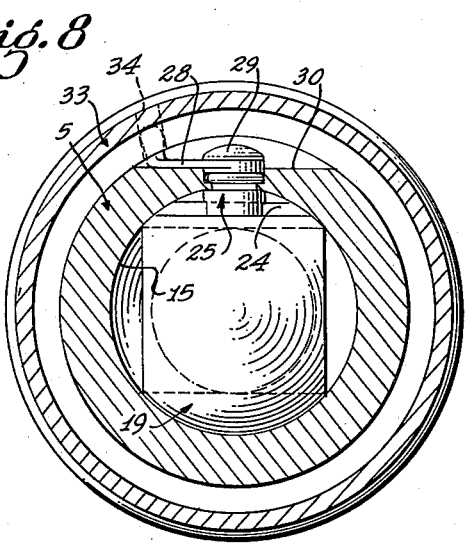
Figure 9:
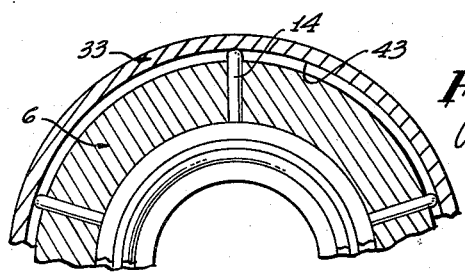

FIGS. 5 and 6 are transverse sectional views through 5—5 and 6—6, respectively, of FIG. 3;

FIGS. 7 and 8 are transverse sectional views through 7—7 and 8—8, respectively, of FIG. 4;

FIG. 9 is a fragmentary transverse sectional view through 9—9 of FIG. 4.

The self-sealing coupling comprises a pair of coupling units A and B which are arranged for end-to-end connection. The remote ends of the coupling units A and B comprise tubular adapter fittings 1 and 2, respectively, which may be identical in construction or may differ, depending upon the fluid handling apparatus which may be joined thereto.

In the construction illustrated, the adapter fitting 1 is shown as provided with an internal screw-threaded remote end, whereas the adapter fitting 2 is provided with an externally screw-threaded remote end. Both fittings are provided with hexagonal flanges 3 intermediate their ends and their confronting ends are provided with externally screw-threaded nipples 4, which receive, respectively, internal screw-threaded ends of tubular coupling bodies 5 and 6. Seal rings 7 are provided to effect seals between the coupling bodies 5 and 6 and the flanges 3.

The extremity of the coupling body 6 is provided with an external flange 8 and the extremity surrounded by the flange 8 is provided with a counterbore 9.

The coupling body 5 is provided with an axial lip 10 which fits into the counterbore 9 and a shoulder 11 which confronts the axial extremity of the flange 8. A seal ring 12 is set within the base end of the counterbore 9 and engages the axial end of the coupling body 5.

The counterbore 9 and lip 10 are provided with mating annular grooves which receive a split resilient locking ring 13. The locking ring 13 is biased to tend to expand into the groove within the counterbore 9 and this groove is sufficiently deep for the locking ring 13 to expand radially to clear the lip 10.

The flange 8 is provided with radiating pins 14 which engage the locking ring 13 to be yieldingly urged outward thereby and which may be forced radially inward to compress the locking ring for engagement with the lip 10, as will be described in more detail hereinafter.

Each coupling body 5 and 6 projects beyond its adapter fitting and is internally enlarged to form a substantially spherical valve chamber 15. The ends of the coupling bodies between the valve chambers 15, that is, the confronting ends of the coupling bodies, are constricted to form bores 16 and 17. These bores may be the same diameter as the bores through the adapter fittings 1 and 2. The ends of the valve chambers 15 adjacent the bores 16 and 17 are provided with sealing lands 18 in the form of spherical zones.

Mounted within each valve chamber 15 is a spherical valve member 19 having a bore 20 which may be equal in diameter to the bores 16 and 17 so that when the valve members are in their open position there is a continuous passage of uniform diameter from the adapter fitting 1 to the adapter fitting 2.

Mounted within each valve chamber 15 adjacent its adapter fitting is a bearing ring 21 having a portion of spherical contour confronting the corresponding valve member. The inner margin of this portion forms a sealing land 22 which bears against the valve member. A corrugated spring 23 is interposed between each bearing ring 21 and the confronting extremity of the corresponding adapter fitting to keep the ball firmly in place against the sealing lands 18.

Each valve member 19 is flattened externally at one side and provided with a rib 24, which is shown as extending parallel with the bore 20. Each coupling body 5 and 6 is provided with a transverse bore at right angles to the longitudinal bore and intersecting the center of the corresponding valve member 19. Fitted in each such transverse bore is a stem 25 provided with a seal ring 26. The radially inner end of each stem 25 is provided with a slotted head 27 which fits over the corresponding rib 24. The axially outer end of each stem 25 may be made square or provided with opposed flats to receive a lever arm 28. Each lever arm is held in place by a screw 29. Each lever arm 28 extends laterally and each adapter fitting is provided with a clearance flat 30 to permit movement of the lever arm 28. The extremity of each lever arm 28 is provided with a pivot lug or crank pin 31.

Figure 1:
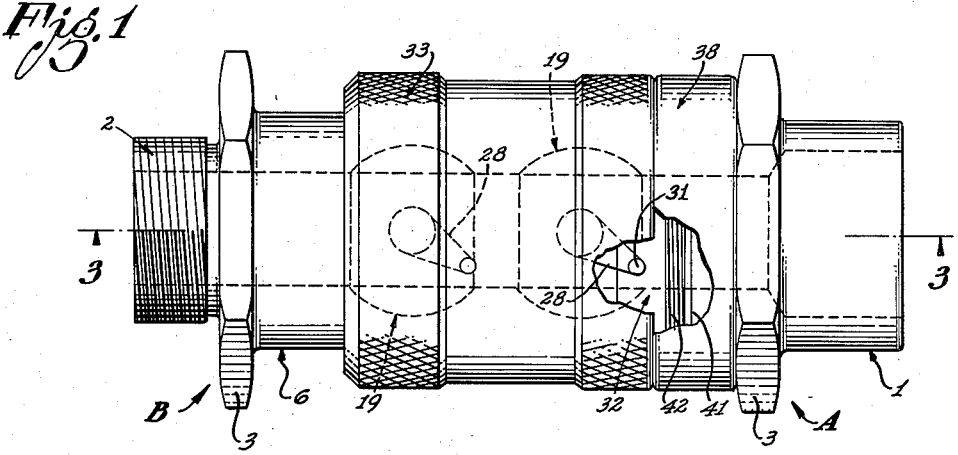
FIGURE 1 is a side view of the coupling with the coupling components or units pressed together and a portion broken away to show the underlying structure.
Figure 2:
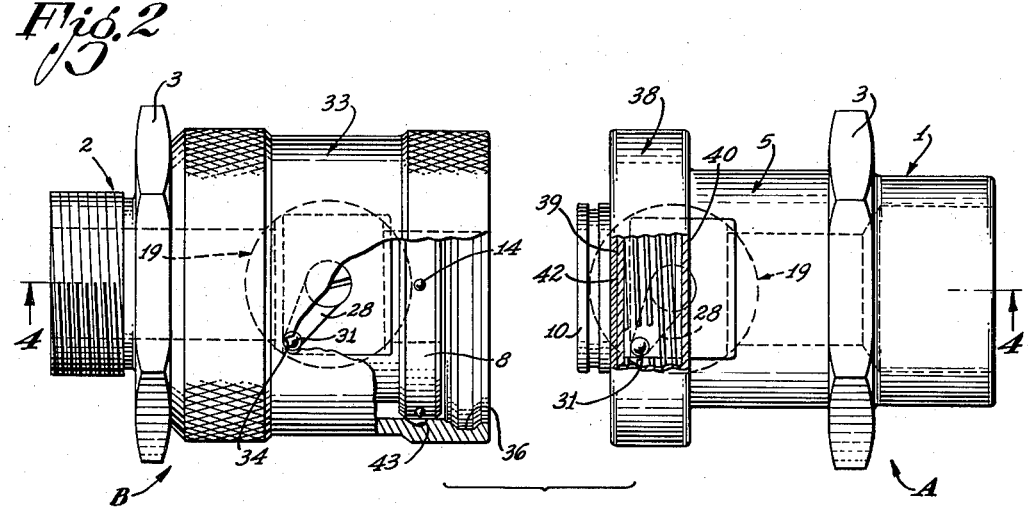
FIG. 2 is a side view of the coupling showing the coupling components or units separated from each other and with portions broken away and in section to show the underlying structure.

Mounted on the coupling body 5 is an actuator ring 32 which is capable of axial movement as well as limited rotational movement. Mounted on the coupling body 6 is an actuator sleeve 33 of sufficient length to extend over the coupling body 5. The actuator ring 32 and actuator sleeve 33 are provided with journal bores 34 which receive the crank pins 31, connected through the lever arms 28 to the valve members 19 mounted within the respective coupling bodies 5 and 6. The connection between each crank pin 31 and the corresponding actuator ring 32 or actuator sleeve 33 is such that on axial movement of the actuator ring 32 or sleeve 33 the valve members 19 may be moved between their open and closed positions, as indicated in FIGS. 1 and 2.

The actuator ring 32 is provided with several radial apertures in a common plane that is normal to the coupling axes, which apertures house what may be termed latch means in the form of balls 35. The extremity of the actuator sleeve 33 is adapted to overlie the actuator ring 32 and is provided with an internal latch groove 36 which receives the key balls 35. When the coupling is closed with the coupling bodies 5 and 6 joined together, the latch balls are held in outer positions by the cylindrical outer surface of the coupling body 5 with the balls in latching engagement with the internal latch groove 36. However, near the extremity of the coupling body 5 having the lip 10 the coupling body is provided with an external latch groove 37 into which the latch balls 35 may fit so as to clear the internal latch groove 36, as will be brought out hereinafter.

When the coupling bodies 5 and 6 are joined together, the actuator ring 32 and actuator sleeve 33 are also joined together for movement in unison, but when the coupling bodies 5 and 6 are separated, the latch balls 35 fit into the external groove 37 and the actuator sleeve 33 is disengaged from the actuator ring 32.

The actuator ring 32 is provided with a retainer ring 38 which is slidable axially thereover and which confines the latch balls 35. The retainer ring 38 is provided at its respective axial extremities with a minor inner circumferential flange 39 slidable over the actuator ring 32 and a major inner circumferential flange 40 which abuts the axial end of the actuator ring. The axial end of the actuator ring 32 engaged by the flange 40 is provided with an outer circumferential flange 41.

Interposed between the outer circumferential flange 41 of the actuator ring 32 and the inner circumferential flange 39 of the retainer ring 38 is a spring 42 which may be formed of flat wire and wound conically. Normally, the spring 42 holds the retainer ring 38 in position telescoped over the actuator ring 32, as shown in FIGS. 2 and 4. However, the axially outer side of the flange 39 is engageable by the end of the actuator sleeve 33 to displace the retainer ring 38 axially so that the internal latch groove 36 may align with and receive the latch balls 35, as shown in FIGS. 1, 3, and 5.

The flange 8 of the coupling body 6 serves as a stop to limit axial movement of the actuator sleeve 33 along the cylindrical outer surface of the coupling body 6. That portion of the actuator sleeve 33 which extends over the coupling body 5 and actuator ring 32 is counterbored to clear the flange 8.

Formed within the counterbored portion of the actuator sleeve 33 is an internal groove 43 which, when the actuator sleeve 33 has been retracted as shown in FIGS. 2, 4, and 9, registers with the radiating pins 14 to permit outward movement so that the locking ring 13 may move to its disengaged position, clear of the lip 10 of the coupling body 5. One side of the internal groove 43 is beveled to form a cam surface for forcing the radiating pins 14 inward and causing the locking ring 13 to engage the lip 10 of the coupling body 5.

Operation of the self-sealing coupling is as follows:

When the two coupling bodies 5 and 6 are separated from each other, the valve members are in their closed positions as shown in FIGS. 2, 4, 7, and 8, the actuator sleeve 33 is in its retracted position, and the locking ring 13 is in its expanded position. Also the retainer ring 38 overlies the actuator ring 32, and both of these members are held in positions adjacent the extremity of the valve housing 5 by engagement of the latch balls 35 into the external latch groove 37.

In order to join the coupling bodies 5 and 6, it is merely necessary to insert the lip 10 of the coupling body 5 into the counterbore 9 of the coupling body 6 and then move the actuator sleeve 33 toward an extended position over the coupling body 5; that is, to move the actuator sleeve 33 to the right as viewed in FIGS. 2 and 4.

Initial extension movement of the actuator sleeve 33 causes the pins 14 to constrict the locking ring 13 into the locking groove formed within the lip 10 of the coupling body 5. When this is accomplished, the two coupling bodies are locked together as well as sealed together.

Substantially simultaneously with the interlocking of the two coupling bodies 5 and 6, the actuator sleeve 33 displaces the retainer ring 38 so that the latch balls 35 may move into the internal latch groove 36. Continued extension of the actuator sleeve 33 moves the actuator ring 32 in unison therewith and causes both valve members 19 to move in unison to their open position shown in FIGS. 1, 3, 5, and 6.

In order to disconnect the coupling bodies 5 and 6, it is merely necessary to retract the actuator sleeve 33 with simultaneous rotation. The initial movement of the actuator sleeve 33 and ring 32 closes the valve members 19, and the final retraction movement of the actuator sleeve 33 releases the locking ring 13 so that the coupling bodies may be separated. It should be noted that if the conditions of use require, any suitable auxiliary latching means, not shown, may be provided to prevent accidental disconnection of the coupling bodies. It may be noted that disconnection of the coupling bodies requires not only axial movement but also simultaneous rotary movement of both the actuator ring 32 and the actuator sleeve 33. The frictional resistance in these simultaneous movements makes accidental disconnection unlikely.

It will be observed that the lever arms 28 are so positioned as to afford substantially maximum leverage when the valve members 19 are in their closed position and the coupling bodies are separated. This is desirable due to the fact that if the fluid retained by the valve members 19 is under substantial pressure, the force required to initiate movement of the valve members from their closed to their open position is greater than the force required to initiate movement of the valve members from their open toward their closed position.

However, it should be noted that the valve members 19 do not displace any fluid so that the loads imposed by fluid pressure are limited to the frictional resistance imposed by engagement of the valve members 19 with the sealing lands 18.

It will be observed that the bores 16 and 17 between the valve members 19 have an extremely short axial length. As a consequence, when the coupling bodies 5 and 6 are disconnected, the only fluid which can escape is the small amount of fluid within these short bores 16 and 17.

The coupling body 6 may be referred to as a first coupling body and the actuator sleeve 33 may be termed a first actuator member movably mounted on the first coupling body to operate a first valve therein. In like manner, the coupling body 5 may be referred to as a second coupling body and the actuator ring 32 may be termed a second actuator member movably mounted on the second coupling body to operate a second valve therein. When the two coupling bodies are juxtaposed, as shown in FIGS. 1 and 3, the two actuator members have a range of movement in unison relative to the two coupling bodies with the two valves operatively responsive to a major portion of the relative movement and with the locking ring 13 responsive to a minor portion of the range of movement that is outside the major portion. The arrangement is such that the two valves close in response to movement of the two actuators towards the minor portion of the range and vice versa, and the locking ring locks in response to movement of the two actuator members towards the major portion of the range. The importance of these relationships is that the movement in unison of the two actuator members in the direction to close the valves and release the two coupling bodies from each other causes the valves to be closed for completely sealing off the two passage means before the two coupling bodies are unlocked. Conversely, in the procedure for closing the coupling, the movement of the two actuator members in the direction to lock the two coupling bodies together and to open the two valves results in completion of the locking operation before the valves open to unseal the two passage means. Thus the invention insures that the two passage means will always be sealed off whenever the two passage means are disconnected.

A feature of the invention is the manner in which various parts perform multiple functions. One example is the manner in which the radial pins 14 not only serve as means to contract the locking ring 13 for disconnection of the two coupling bodies but also serves as means to releasably latch the actuator sleeve 33 in its retracted position. Another example is the manner in which the internal groove 43 of the actuator sleeve 33 which serves as cam means for retracting the pins 14 also serves as latch means in cooperation with the pins to yieldingly retain the actuator sleeve 33 in its rearward retracted position.

Another example is the manner in which the latching balls 35 not only cooperate with the external latch groove 37 for latching the actuator ring 32 in its forward position but also alternately cooperate with the internal latch groove 36 to latch the two actuator members together for movement in unison. Another example is the manner in which the retainer ring 38 in cooperation with the spring 42 has, first, the function of locking the latching balls 35 in the groove 37 when the two coupling bodies are separated, as may be seen in FIG. 4, second, the function of urging the actuator sleeve 33 and the actuator ring 32 apart when the two coupling bodies are interlocked, as may be seen in FIG. 3, and, third, the function of cooperating with the actuator sleeve 33 to urge the latching balls 35 radially inward by cam action when the coupling is closed, as may be seen in FIG. 3, thereby to create frictional resistance to retraction of the actuator sleeve 33.

Another feature of the invention is that the coupling is so largely automatic in the manner in which various parts respond to other parts. The two valves and the locking ring 13 respond to movement in unison of the two actuator members. The actuator sleeve 33 is latched automatically in its rearward retracted position in response to rearward movement to that position. The actuator ring 32 is automatically latched in its forward limit position in response to its movement to that position. The two actuator members are automatically latched together in response to axial movement of the first actuator member against the second actuator member.

While a particular embodiment of this invention has been shown and described, it is not intended to limit the same to the exact details of the construction set forth, and it embraces such changes, modifications, and equivalents of the parts and their formation and arrangement as come within the purview of the appended claims.

What is claimed is:

1. A coupling assembly for releasably interconnecting two passage means, comprising: a first coupling body and a second coupling body for mounting on the ends of said two passage means respectively; two valves in said coupling bodies respectively to seal said two passage means respectively when the two coupling bodies are separated; cooperating means carried by the two coupling bodies to lock the two coupling bodies together in juxtaposed relation in a fluid-tight manner to place said two passage means in communication with each other; and actuator means mounted on at least one of the two coupling bodies for movement over a given range relative to the two coupling bodies when the two coupling bodies are juxtaposed, said two valves being operatively responsive to movement of said actuator means over a first portion of said range and said locking means being operatively responsive to movement of said actuator means over a second portion of said range entirely outside said first portion, with the two valves closing in response to movement of the actuator means towards said second portion and vice versa and with said locking means locking in response to movement of said actuator means towards said first portion and vice versa, whereby said two valves are always closed whenever said locking means is released for separation of the two coupling bodies.

2. A coupling assembly as set forth in claim 1 in which said actuator means comprises two actuator members on said two coupling bodies respectively movable in unison when the two bodies are juxtaposed and which includes means to interlock said two actuator members in response to their joint movement out of said second portion of the range into said first portion.

3. A coupling assembly for releasably interconnecting two passage means, comprising: a first coupling body for mounting on the end of one of said two passage means; a second coupling body for mounting on the end of the other of said two passage means; a first actuator on the exterior of said first coupling body movable from a rearward retracted position to a forward position; a second actuator on the exterior of said second coupling body in the path of movement of said first actuator when the two coupling bodies are juxtaposed for movement from a forward position to a rearward position in unison with movement of said first actuator from its rearward position to its forward position; a first valve in said first coupling body to seal the corresponding passage means when the two coupling bodies are separated, said first valve being responsive to said first actuator to open in response to forward movement of the first actuator and vice versa; a second valve in said second coupling body to seal the corresponding passage means when the two coupling bodies are separated, said second valve being responsive to said second actuator to open in response to rearward movement of the second actuator and vice versa; and means to lock said two coupling bodies together in juxtaposed positions, said locking means being operatively connected to one of said two actuators for operation in response to a minor portion of the range of movement in unison of the two actuators, said two valve means being responsive to a major portion of said range of movement that is outside said minor portion.

4. A coupling assembly for releasably interconnecting two passage means, comprising: a first coupling body for mounting on the end of one of said two passage means; a second coupling body for mounting on the end of the other of said two passage means; a first actuator on the exterior of said first coupling body movable from a rearward retracted position to a forward position; a second actuator on the exterior of said second coupling body in the path of movement of said first actuator when the two coupling bodies are juxtaposed for movement from a forward position to a rearward position in unison with movement of said first actuator from its rearward position to its forward position; a first valve in said first coupling body to seal the corresponding passage means when the two coupling bodies are separated, said first valve being responsive to said first actuator to open in response to forward movement of the first actuator and vice versa; a second valve in said second coupling body to seal the corresponding passage means when the two coupling bodies are separated, said second valve being responsive to said second actuator to open in response to rearward movement of the second actuator and vice versa; means to lock said two coupling bodies together in juxtaposed positions, said locking means being operatively responsive to one of the two said actuators; means on said first coupling body to releasably latch said first actuator in its rearward position to hold said first valve closed when the two coupling bodies are separated; and means on said second coupling body to releasably latch said second actuator in its forward position to hold said second valve closed when the two coupling bodies are separated.

5. A coupling assembly for releasably interconnecting two passage means, comprising: a first coupling body for mounting on the end of one of said two passage means; a second coupling body for mounting on the end of the other of said two passage means; a first actuator on the exterior of said first coupling body movable from a rearward retracted position to a forward position; a second actuator on the exterior of said second coupling body in the path of movement of said first actuator means when the two coupling bodies are juxtaposed for movement from a forward position to a rearward position in unison with movement of said first actuator from its rearward position to its forward position; a first valve in said first coupling body to seal the corresponding passage means when the two coupling bodies are separated, said first valve being responsive to said first actuator to open in response to forward movement of the first actuator and vice versa; a second valve in said second coupling body to seal the corresponding passage means when the two coupling bodies are separated, said second valve being responsive to said second actuator to open in response to rearward movement of the second actuator and vice versa; means responsive to movement of said first actuator against said second actuator to latch the two actuators together for movement in unison; and means operatively responsive to one of said two actuators to releasably lock said coupling bodies together in response to the movement in unison of the two actuators in the direction to open the two valves.

6. A coupling assembly for releasably interconnecting two passage means, comprising: a first coupling body for mounting on the end of one of said two passage means; a second coupling body for mounting on the end of the other of said two passage means; a first actuator on the exterior of said first coupling body movable from a rearward retracted position to a forward position; a second actuator on the exterior of said second coupling body in the path of movement of said first actuator means when the two coupling bodies are juxtaposed for movement from a forward position to a rearward position in unison with movement of said first actuator from its rearward position to its forward position; a first valve in said first coupling body to seal the corresponding passage means when the two coupling bodies are separated, said first valve being responsive to said first actuator to open in response to forward movement of the first actuator and vice versa; a second valve in said second coupling body to seal the corresponding passage means when the two coupling bodies are separated, said second valve being responsive to said second actuator to open in response to rearward movement of the second actuator and vice versa; means to lock said two coupling bodies together in juxtaposed positions, said locking means being operatively responsive to one of said two actuators; means on said first coupling body to releasably latch said first actuator in its rearward position to hold said first valve closed when the two coupling bodies are separated; a second latch means movable with said second actuator for engagement with said second coupling body to releasably hold the second actuator in its forward position in response to movement of the second actuator to its forward position, said second latch means being responsive to movement of said first actuator against said second actuator to unlatch the second actuator from the second coupling body and to latch the second actuator to the first actuator for movement therewith.

7. A coupling assembly for releasably interconnecting two passage means, comprising: a first coupling body for mounting on the end of one of said two passage means; a second coupling body for mounting on the end of the other of said two passage means; a first actuator on the exterior of said first coupling body movable from a rearward retracted position to a forward position; a second actuator on the exterior of said second coupling body in the path of movement of said first actuator when the two coupling bodies are juxtaposed for movement from a forward position to a rearward position with movement of said first actuator from its rearward position to its forward position; a first valve in said first coupling body to seal the corresponding passage means when the two coupling bodies are separated, said first valve being responsive to said first actuator to open in response to forward movement of the first actuator and vice versa; a second valve in said second coupling body to seal the corresponding passage means when the two coupling bodies are separated, said second valve being responsive to said second actuator to open in response to rearward movement of the second actuator and vice versa; means responsive to one of said two actuators to lock said two coupling bodies together in juxtaposed position when the two actuators are moved in the direction to open said two valves; means yieldingly mounted on said second actuator for retraction by said first actuator to oppose the forward movement of the first actuator; and latch means movable with said second actuator to latch said second actuator to said second coupling body at the forward position of the second actuator to hold said second valve closed when the two coupling bodies are separated, said latch means being responsive to said second actuator for engagement with the second coupling body in response to movement of the second actuator to its forward position, said latch means being responsive to said yieldingly mounted means to release in response to retraction of the yieldingly mounted means by said first actuator.

8. A coupling assembly as set forth in claim 7 in which said latch means is responsive to rearward movement of the second actuator by said first actuator to latch the two actuators together for movement in unison.

9. A coupling assembly for releasably interconnecting two passage means, comprising: a first coupling body for mounting on the end of one of said two passage means; a second coupling body for mounting on the end of the other of said two passage means; a first actuator on the exterior of said first coupling body movable from a rearward retracted position to a forward position; a second actuator on the exterior of said second coupling body in the path of movement of said first actuator when the two coupling bodies are juxtaposed for movement from a forward position to a rearward position with movement of said first actuator from its rearward position to its forward position; a first valve in said first coupling body to seal the corresponding passage means when the two coupling bodies are separated, said first valve being responsive to said first actuator to open in response to forward movement of the first actuator and vice versa; a second valve in said second coupling body to seal the corresponding passage means when the two coupling bodies are separated, said second valve being responsive to said second actuator to open in response to rearward movement of the second actuator and vice versa; resilient means carried by one of said coupling bodies to lock the two coupling bodies together in juxtaposed positions when said two actuators are in positions to hold said two valves open, said locking means being resiliently biased to release the two coupling bodies from each other; means responsive to one of said two actuators to force said locking means to its locking position in response to movement of said one actuator in the direction for closing the corresponding valve, said one actuator having a latching shoulder for engagement by said last-mentioned responsive means under yielding force from said locking means to latch said one actuator in position with the corresponding valve closed when the two coupling bodies are separated.

10. A coupling assembly as set forth in claim 9 in which said locking means is a split resilient ring for contraction to lock the two coupling bodies together, said split ring being biased to expand to unlock the two coupling bodies.

11. A coupling assembly for releasably interconnecting two passage means, comprising: a first coupling body for mounting on the end of one of said two passage means; a second coupling body for mounting on the end of the other of said two passage means; a first actuator on the exterior of said first coupling body movable from a rearward retracted position to a forward position; a second actuator on the exterior of said second coupling body in the path of movement of said first actuator when the two coupling bodies are juxtaposed for movement from a forward position to a rearward position in unison with movement of said first actuator from its rearward position to its forward position; a first valve in said first coupling body; a crank for operation of said first valve, said crank being operatively connected to the valve and having a crank pin operatively engaged by said first actuator for operating the valve in response to movement of the first actuator; a second valve in said second coupling body; a crank for operation of said second valve, said last-mentioned crank having a crank pin in engagement with said second actuator for operation of the valve in response to movement of the second actuator; and means to lock said two coupling bodies together in juxtaposed positions, said locking means being operatively connected to one of said two actuators for operation in response to a minor portion of the range of movement in unison of the two actuators, said two valve means being responsive to a major portion of said range of movement that is outside said minor portion.

References Cited in the file of this patent

UNITED STATES PATENTS

| | | |
|---|---|---|
| 187,982 | Pirsson et al. | Mar. 6, 1877 |
| 1,115,945 | Kunz | Nov. 3, 1914 |
| 1,428,933 | Bean | Sept. 12, 1922 |
| 1,495,516 | Hobart | May 27, 1924 |
| 2,440,946 | Hansen | May 4, 1948 |
| 2,948,553 | Gill et al. | Aug. 9, 1960 |

FOREIGN PATENTS

| | | |
|---|---|---|
| 131,231 | Austria | Jan. 10, 1933 |